US011021059B2

(12) United States Patent
Feng et al.

(10) Patent No.: US 11,021,059 B2
(45) Date of Patent: Jun. 1, 2021

(54) VEHICULAR DISPLAY ASSEMBLY HAVING A FOLDABLE FLEXIBLE DISPLAY DEVICE WITH STORAGE BOX

(71) Applicants: Chengdu BOE Optoelectronics Technology Co., Ltd., Chengdu (CN); BOE Technology Group Co., Ltd., Beijing (CN)

(72) Inventors: Yuhsiung Feng, Beijing (CN); Wenbao Gao, Beijing (CN); Jia Zeng, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 48 days.

(21) Appl. No.: 16/464,329

(22) PCT Filed: Oct. 29, 2018

(86) PCT No.: PCT/CN2018/112487
§ 371 (c)(1),
(2) Date: May 28, 2019

(87) PCT Pub. No.: WO2019/200885
PCT Pub. Date: Oct. 24, 2019

(65) Prior Publication Data
US 2020/0331348 A1    Oct. 22, 2020

(30) Foreign Application Priority Data
Apr. 20, 2018    (CN) .......................... 201810358967.5

(51) Int. Cl.
*B60K 35/00*    (2006.01)
*G06F 3/041*    (2006.01)

(52) U.S. Cl.
CPC .............. *B60K 35/00* (2013.01); *G06F 3/041* (2013.01); *B60K 2370/143* (2019.05);
(Continued)

(58) Field of Classification Search
CPC ....................................................... B60K 35/00
(Continued)

(56) References Cited

U.S. PATENT DOCUMENTS 6,663,155 B1    12/2003    Malone et al.
2015/0002991 A1    1/2015    Sluis
(Continued)

FOREIGN PATENT DOCUMENTS

CN    203793237 U    8/2014
CN    104249622 A    12/2014
(Continued)

OTHER PUBLICATIONS

Chinese Office Action issued in corresponding Chinese Patent Application No. 201810358967.5 dated Apr. 14, 2020.
(Continued)

*Primary Examiner* — Long D Pham
(74) *Attorney, Agent, or Firm* — Arent Fox LLP; Michael Fainberg (57) ABSTRACT

This disclosure relates to a vehicular display assembly and a vehicle, and the vehicular display assembly includes: a storage box; and a display device arranged on an opening side of the storage box, wherein the display device includes a laid state or a folding state, wherein the display device which is laid shields the opening of the storage box, and the display device which is folded exposes at least a part of the opening of the storage box.

12 Claims, 6 Drawing Sheets

(52) U.S. Cl.
CPC .... *B60K 2370/152* (2019.05); *B60K 2370/67* (2019.05); *B60K 2370/774* (2019.05); *G06F 2203/04102* (2013.01); *G06F 2203/04103* (2013.01)

(58) Field of Classification Search
USPC .......................................................... 345/173
See application file for complete search history.

(56) References Cited

U.S. PATENT DOCUMENTS

| | | |
|---|---|---|
| 2016/0259365 A1 | 9/2016 | Wang et al. |
| 2017/0045996 A1* | 2/2017 | Ka ........................ G06F 1/1694 |
| 2017/0083047 A1 | 3/2017 | Hélot et al. |
| 2018/0120901 A1 | 5/2018 | Jin et al. |

FOREIGN PATENT DOCUMENTS

| | | |
|---|---|---|
| CN | 204567468 U | 8/2015 |
| CN | 105511562 A | 4/2016 |
| CN | 105938684 A | 9/2016 |
| CN | 106103175 A | 11/2016 |
| CN | 205930542 U | 2/2017 |
| CN | 206561817 U | 10/2017 |
| CN | 206734190 U | 12/2017 |
| CN | 207190917 U | 4/2018 |
| JP | 2006347510 A | 12/2006 |

OTHER PUBLICATIONS

PCT/CN2018/112487 International Search Report dated Jan. 30, 2019.

* cited by examiner

Fig. 8

VEHICULAR DISPLAY ASSEMBLY HAVING A FOLDABLE FLEXIBLE DISPLAY DEVICE WITH STORAGE BOX

This application is a National Stage of International Application No. PCT/CN2018/112487, filed on Oct. 29, 2018, which claims the priority of Chinese Patent Application No. 201810358967.5, filed with the Chinese Patent Office on Apr. 20, 2018, and entitled "A vehicular display assembly and a vehicle", both of which are hereby incorporated by reference in their entireties.

FIELD

This disclosure relates to the field of display technologies, and particularly to a vehicular display assembly and a vehicle.

BACKGROUND

As the vehicle industry is flourishing, vehicular displays are developing rapidly, but as there are more and more designed functions in a vehicle, there is a narrower and narrower space available in the vehicle, so it is desirable at present to reasonably design a vehicular display device, and to make full use of the space in the vehicle.

SUMMARY

Some embodiments of this disclosure provide a vehicular display assembly including:

a storage box; and a display device arranged on an opening side of the storage box, wherein:

the display device includes a laid state or a folding state, wherein the display device which is laid shields the opening of the storage box, and the display device which is folded exposes at least a part of the opening of the storage box.

Optionally, in some embodiments of this disclosure, the display device includes a flexible display panel, and a bendable support layer, located on a side of the flexible display panel away from a display face thereof, configured to support the flexible display panel.

Optionally, in some embodiments of this disclosure, the support layer includes: a fixed section, a rotatable section, and a pivot located between the fixed section and the rotatable section, wherein:

the fixed section is connected with the rotatable section through the pivot; and the fixed section is fixed relative to the opening of the storage box, and the rotatable section is configured to be rotated around the pivot to thereby bring the flexible display panel into being folded.

Optionally, in some embodiments of this disclosure, the vehicular display assembly further includes a controller configured to control the rotatable section to be rotated.

Optionally, in some embodiments of this disclosure, the controller is configured to control the rotatable section to be rotated, by driving it electromagnetically, hydraulically, pneumatically, or using an elastic element or a connection rod.

Optionally, in some embodiments of this disclosure, the vehicular display assembly further includes a switching switch configured to control the controller to work.

Optionally, in some embodiments of this disclosure, the switching switch is a physical button, or a virtual button in the display device.

Optionally, in some embodiments of this disclosure, in response to that the display device is folded, a display face of the display device faces inward.

Optionally, in some embodiments of this disclosure, in response to that the display device is laid, a display face of the display device is flush with the opening of the storage box.

Optionally, in some embodiments of this disclosure, the display device is a touch display device.

Correspondingly some embodiments of this disclosure further provide a vehicle including the vehicular display assembly according to embodiments of this disclosure.

Optionally, in some embodiments of this disclosure, the vehicle further includes a console located between primary and secondary driver seats; and the vehicular display assembly is arranged on the console.

DETAILED DESCRIPTION OF THE EMBODIMENTS

The technical solutions according to embodiments of this disclosure will be described below clearly and fully with reference to the drawings in embodiments of this disclosure. Apparently embodiments to be described are only a part but all of the embodiments of this disclosure. Based upon embodiments here of this disclosure, all of other embodiments which can occur to those ordinarily skilled in the art without any inventive effort shall come into the scope of this disclosure as claimed.

Figure 1:
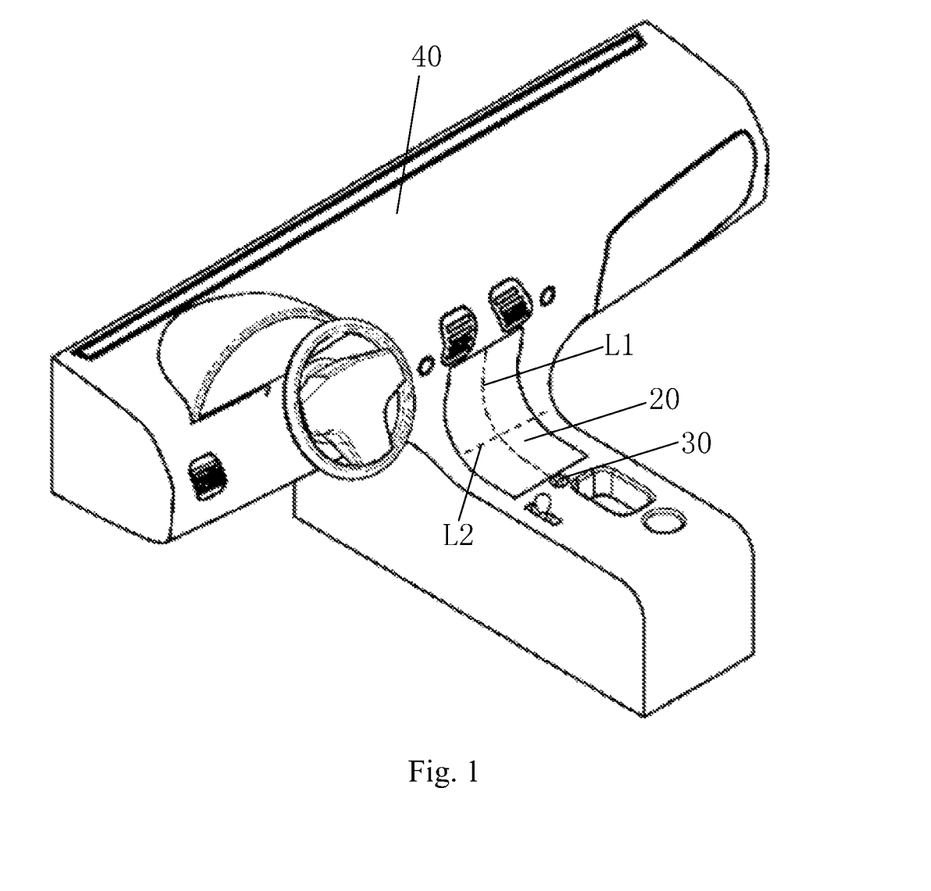
FIG. 1 is a schematic structural diagram of a display device, which is laid, in a vehicular display assembly according to some embodiments of this disclosure.
Figure 2:
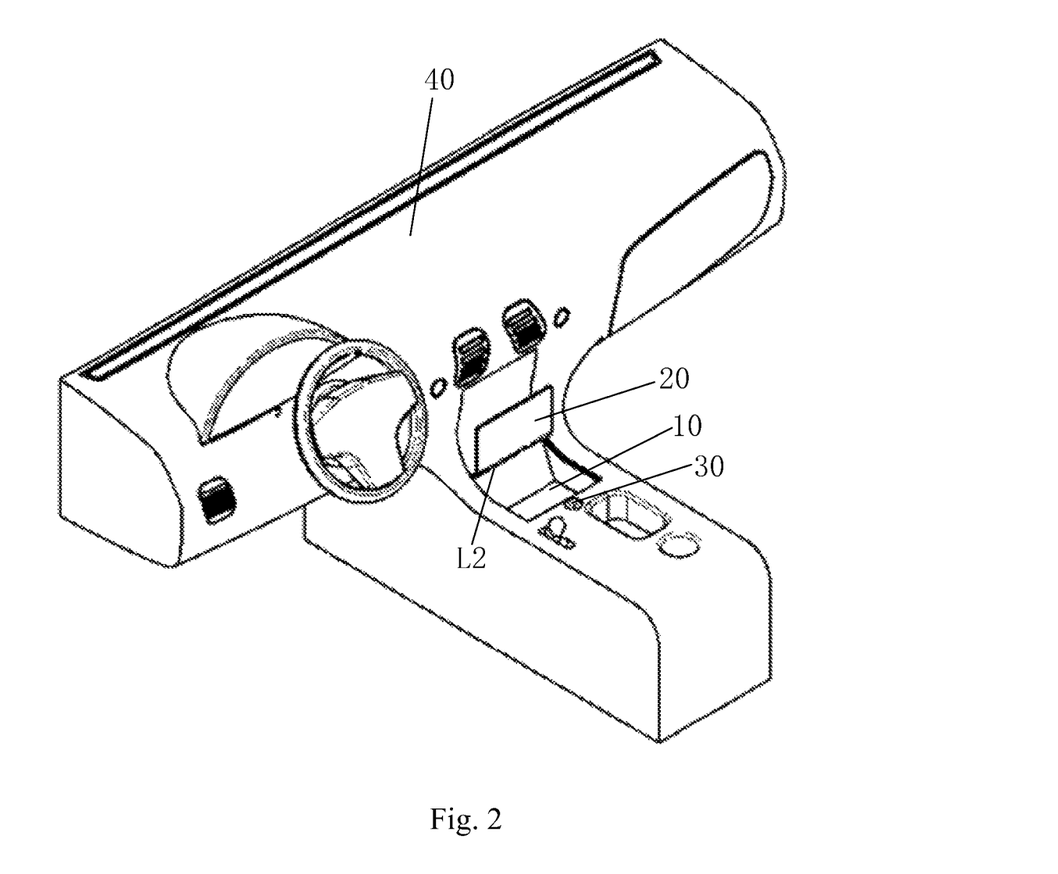
FIG. 2 is a schematic structural diagram of the display device, which is folded, in a vehicular display assembly according to some embodiments of this disclosure.

As illustrated in FIG. 1 and FIG. 2, a vehicular display assembly according to some embodiments of this disclosure includes:

a storage box 10; and a display device 20 arranged on an opening side of the storage box 10.

The display device 20 can be laid (as illustrated in FIG. 1) or folded (as illustrated in FIG. 2), where the display device 20 which is laid shields the opening of the storage box 10, and the display device 20 which is folded exposes at least a part of the opening of the storage box 10.

In the vehicular display assembly above according to embodiments of this disclosure, the display device is arranged on the opening side of the storage box, and when the display device is laid, it can shield the opening of the storage box to thereby hide the storage box below the display device, and can also display some traffic or entertainment information for watching by a passenger; and when the display device is folded, it can expose at least a part of the opening of the storage box to thereby make it convenient for the passenger to take an object out of the box, or to put an object into the box. Accordingly the vehicular display assembly is highly integrated with a number of functions in a diversity of display applications, and designed reasonably in a small volume to thereby make full use of a space in the vehicle.

As illustrated in FIG. 1, when the display device above is laid, it can be a cover of the storage box to shield the opening of the storage box so that the storage box can be hidden below the display device to thereby make reasonable use of the space, and in this state, the display device can display traffic or entertainment information or another image. As illustrated in FIG. 2, when the display device above is folded, it can expose at least a part of the opening of the storage box to thereby make it convenient for the passenger to take an object out of the box, or to put an object into the box, and in the folded state, the display device can be folded outward or inward, although the embodiment of this disclosure will not be limited thereto.

In a particular implementation, the vehicular display assembly above can be applicable to a vehicle, and as illustrated in FIG. 1, the vehicular display assembly above can be arranged on a console 40 of the vehicle, and for example, the vehicular display assembly above can be arranged on the console 40 between primary and secondary driver seats so that a driver and a passenger can watch traffic and entertainment information displayed on the display device. Optionally, a groove acting as the storage box, and an engaging groove for accommodating the display device can be arranged on the console 40, and the display device can be fixed in the engaging groove so that the vehicular display assembly can be arranged on the console. Alternatively the vehicular display assembly can be arranged at another position, e.g., on an armrest of the vehicle, etc., although the position of the armrest vehicular display assembly.

Figure 3:
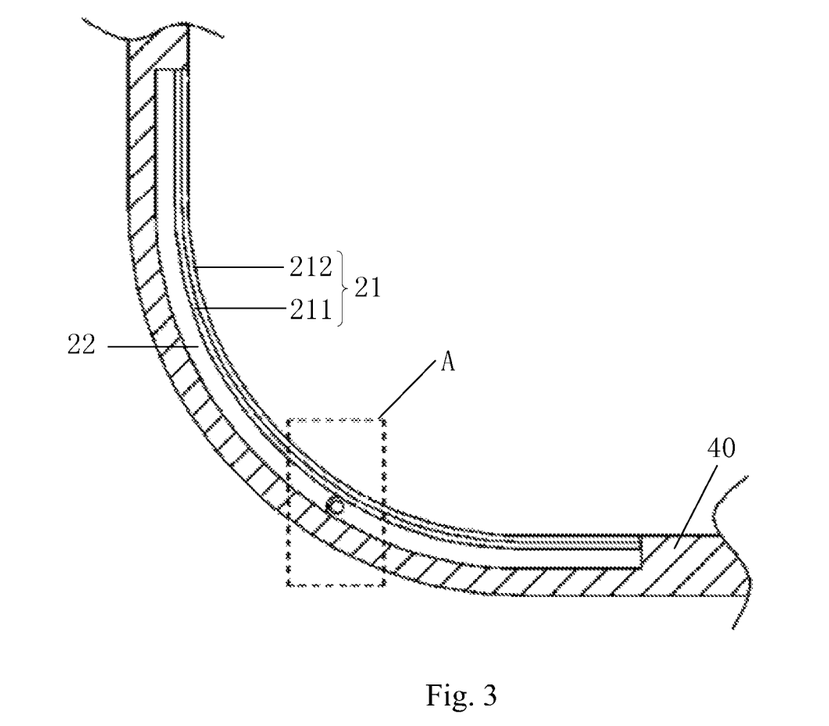
FIG. 3 is a schematic sectional view of the structure as illustrated in FIG. 1 along a dotted line L1.

Optionally, in the vehicular display assembly above according to embodiments of this disclosure, as illustrated in FIG. 3 which is a sectional view of the vehicular display assembly as illustrated in FIG. 1 along the dotted line L, the display device can include a flexible display panel 21, and a bendable support layer 22, located on the side of the flexible display panel 21 away from a display face thereof, configured to support the flexible display panel 21.

In embodiments of this disclosure, since the display device includes the flexible display panel 21, the display device is bendable so that the display device can be switched between the laid and folded states, where the display device can be bent to thereby expose a part of the opening of the storage box, or bent so that the display device resumes its laid state to thereby hide the storage box. Moreover, the support layer 22 is arranged on the side of the flexible display panel 21 away from the display face thereof to support the flexible display panel 21, and the support layer 22 can be bendable so that the support layer 22 can be bent to bring the flexible display panel 21 into motion so as to avoid the flexible display panel 21 from being damaged if it were bent directly, and to protect the flexible display panel 21.

Moreover, it shall be noted that the display device in the embodiment of this disclosure can alternatively be an inflexible display device, and for example, can include two spliced display panels, which can be laid or folded to thereby close or open the storage box.

Figure 4:
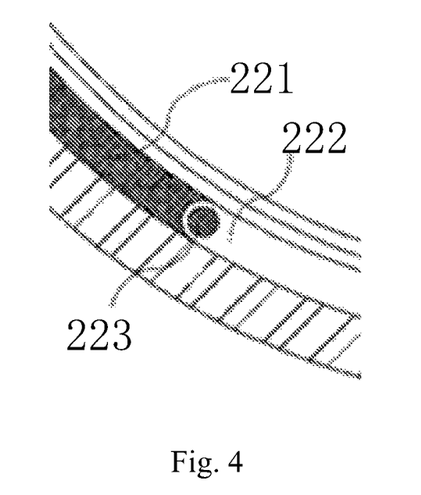
FIG. 4 is a first schematic diagram of a magnified part in a dotted box A in FIG. 3.
Figure 5:
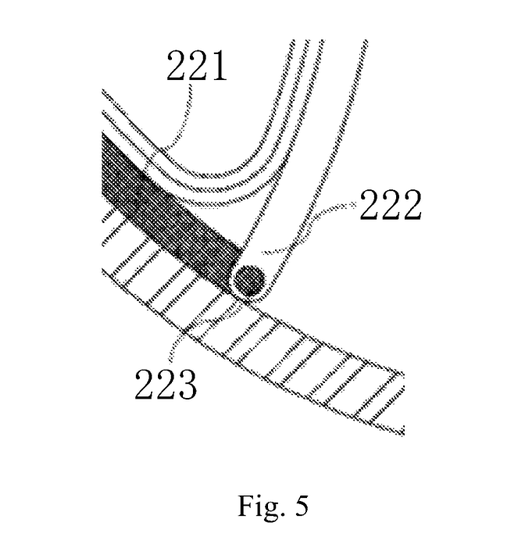
FIG. 5 is a second schematic diagram of the magnified part in the dotted box A in FIG. 3.

FIG. 4 and FIG. 5 are schematic diagrams of a magnified part in the dotted box A in FIG. 3, and as illustrated in FIG. 4 and FIG. 5, in the vehicular display assembly above according to embodiments of this disclosure, the support layer includes: a fixed section 221, a rotatable section 222, and a pivot 223 located between the fixed section 221 and the rotatable section 222.

The fixed section 221 is connected with the rotatable section 222 through the rotatable section 223.

The fixed section 221 is fixed relative to the opening of the storage box, and the rotatable section 222 is configured to be rotated around the rotatable section 223 to thereby bring the flexible display panel into being folded.

In a particular implementation, the fixed section 221 can be fixed at the edge of the opening of the storage box, and for example, the fixed section 221 can be engaged and thus fixed with the edge of the opening of the storage box, and the rotatable section 222 can be rotated around the pivot 223, so the part of the flexible display panel supported by the fixed section 221 is fixed relative to the storage box, and the part thereof supported by the rotatable section 222 can be brought by the rotatable section 222 into being flipped, so that the display device can be laid and flipped. As illustrated in FIG. 1 and FIG. 2, the pivot 223 can be positioned at L2 as illustrated in FIG. 1 and FIG. 2, or another position, although embodiments of this disclosure will not be limited thereto. As illustrated in FIG. 4, when the fixed section 221 and the rotatable section 222 at the support layer are flush with each other, the display face of the flexible display panel is flush with the opening of the storage box so that the display device is laid; and as illustrated in FIG. 5, the rotatable section 222 at the support layer is rotated around the pivot 223 to thereby bring the part of the flexible display panel supported by the rotatable section 222 into being folded, so as to expose the opening of the storage box so that the display device is folded.

Furthermore, in the vehicular display assembly above according to embodiments of this disclosure, the vehicular display assembly can further include a controller configured to control the rotatable section to be rotated (not illustrated). The controller can control the rotatable section to be rotated so that the display device is switched between the laid and folded states to thereby make it more convenient to operate the vehicular display assembly. Of course, the rotatable section of the support layer can alternatively be rotated manually to thereby control the display device to be switched into the laid or folded state, although the embodiment of this disclosure will not be limited thereto.

Figure 6:
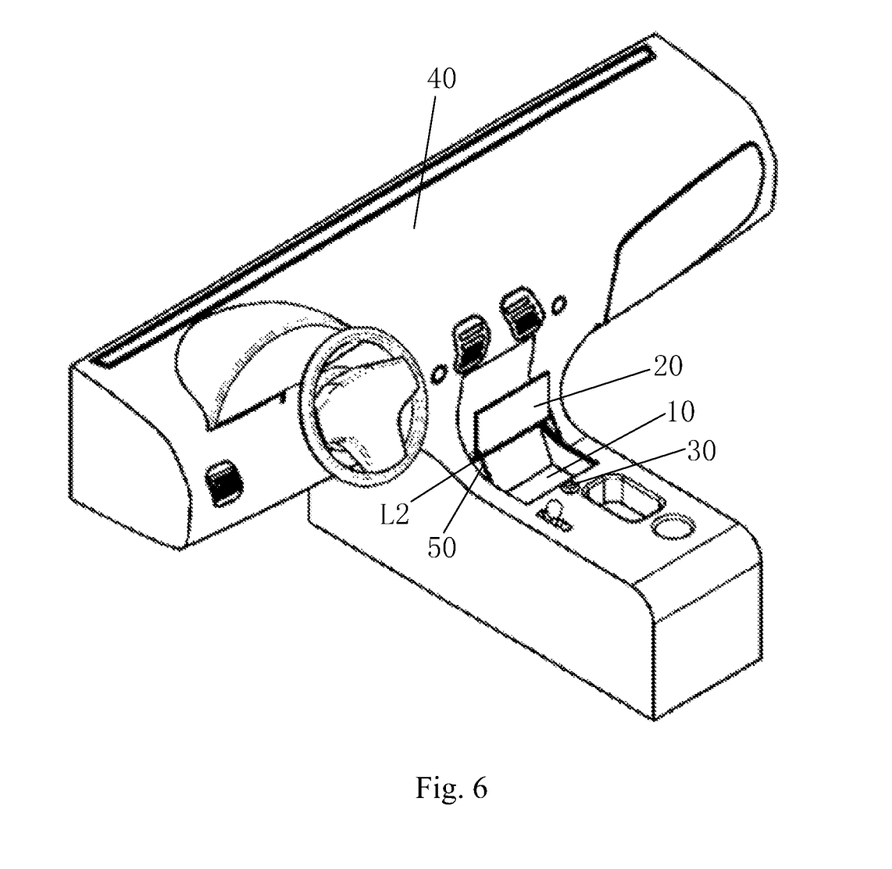
FIG. 6 is a schematic structural diagram of a vehicular display assembly, which is driven using a rod, according to some embodiments of this disclosure.

Optionally, in the vehicular display assembly above according to embodiments of this disclosure, the controller can control the rotatable section to be rotated, by driving it electromagnetically, hydraulically, pneumatically, or using an elastic element or a connection rod. The respective driving modes will not be described below in details, although the driving function of the controller will be described below in details taking a connection rod as an example in embodiments of this disclosure. As illustrated in FIG. 6, the rotatable section 222 can be driven using a connection rod 50 in a transmission mode, and in a particular implementation, a sliding trail corresponding to the connection rod 50 can be arranged at the edge of the storage box 10, where the connection rod 50 can have one end fixed on the rotatable section 222, and the other end installed on the sliding rail, and the controller can control the connection rod 50 to be moved to thereby control the rotatable section 222 to be rotated around the pivot 223 so as to control the display device to be switched between the laid and folded states.

Moreover, in order for the driver or the passenger to control conveniently the state of the display device to be switched, in the vehicular display assembly above according to embodiments of this disclosure, the vehicular display assembly can further include a switching switch configured to operatively control the controller to thereby alleviate the driver or the passenger from folding the display device manually, so as to make it more convenient to operate the vehicular display assembly.

Optionally, the switching switch above can be a physical button, or a virtual button in the display device. As illustrated in FIG. 1, FIG. 2, and FIG. 6, a physical button 30 can be arranged at the edge of the storage box 10 so that the driver or the passenger intending to take an object out of the box, or to put an object into the box can control the display device 20 to be folded, by pressing down the physical button 30, and can control the display device 20 to resume its laid state, by pressing down the physical button 30 after taking the object out of the box, or putting the object into the box. In some scenario, a private object of the driver may be put into the storage box, so the physical button can alternatively be arranged on a steering wheel for a convenient access of the driver thereto. Moreover, the physical button can alternatively be arranged at another position, although embodiments of this disclosure will not be limited thereto. Moreover the switching switch can alternatively be embodied as a virtual button in the display device, so the driver or the passenger can control the state of the display device to be switched, by touching the virtual button in the touch display device.

In a real application, in the vehicular display assembly above according to embodiments of this disclosure, as illustrated in FIG. 2, when the display device 20 is folded, the display face of the display device 20 faces inward, that is, the side of the display device 20 generally away from the storage box 10 is folded so that the backside of the display device 20 (the side thereof away from the display panel) faces outward, so the screen can be protected in effect from being scratched by a sharp object, and from being aged, to thereby prolong the lifetime of the screen.

As illustrated in FIG. 1, when the display device 20 is laid, the display face of the display device 20 is flush with the opening of the storage box, that is, the display face of the display device 20 is roughly flush with the edge of the storage box instead of protruding beyond or being recessed below the opening of the storage box, so that the display screen of the display device 20 can be well protected, but also the display device 20 can appear integral to the storage box, thus resulting in an aesthetically pleasing design of the vehicle, and improving the scientific and technological sense thereof.

In a real application, in the vehicular display assembly above according to the embodiments of this disclosure, the display device above is a touch display device so that the driver or the passenger can touch conveniently the display device in operation. As illustrated in FIG. 3, the flexible display panel 21 can include a display panel 211, and a touch layer 212 located on the light exit face side of the display panel 211 to perform a touch function of the flexible display panel 21, or the display device can alternatively perform a touch function using an in-cell touch display panel, although embodiments of this disclosure will not be limited thereto.

Based upon the same inventive idea, some embodiments of this disclosure further provide a vehicle including the vehicular display assembly above, and all the other indispensable components to the vehicle shall readily occur to those ordinarily skilled in the art, so a repeated description thereof will be omitted here, and embodiments of this disclosure will not be limited thereto. Reference can be made to the embodiments of the vehicular display assembly above for an implementation of the vehicle, so a repeated description thereof will be omitted here.

In a particular implementation, in the vehicle above according to the embodiments of this disclosure, as illustrated in FIG. 1 and FIG. 2, the vehicle can further include a console 40 located between primary and secondary driver seats.

The vehicular display assembly is arranged on the console 40.

As illustrated in FIG. 1, the vehicular display assembly above is arranged on the console 40 located between the primary and secondary driver seats, so that a driver can watch some traffic information, e.g., navigation information, road condition news, etc., on the display device 20, or a passenger sitting in the secondary driver seat can watch some entertainment information. As illustrated in FIG. 2, when the display device 20 is folded, it can expose the hidden storage box 10 so that the driver or the passenger can take an object out of the box, or put an object into the box.

Figure 7:
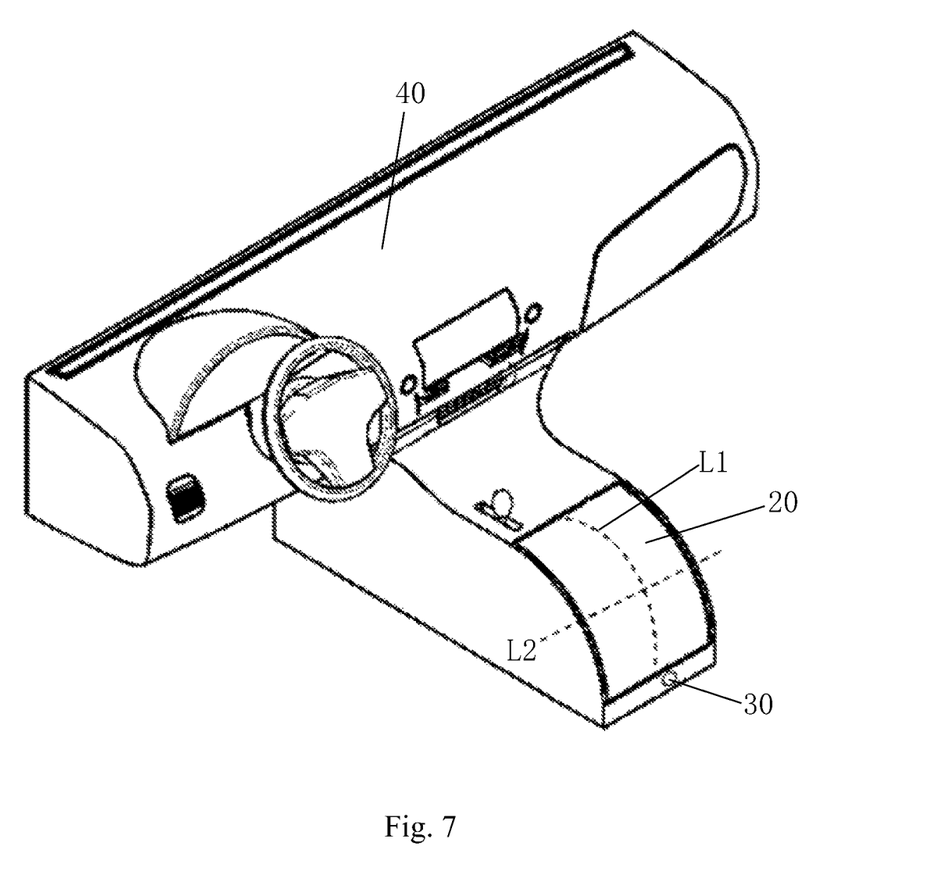
FIG. 7 is a schematic structural diagram of a display device, which is laid, in another vehicular display assembly according to some embodiments of this disclosure.
Figure 8:
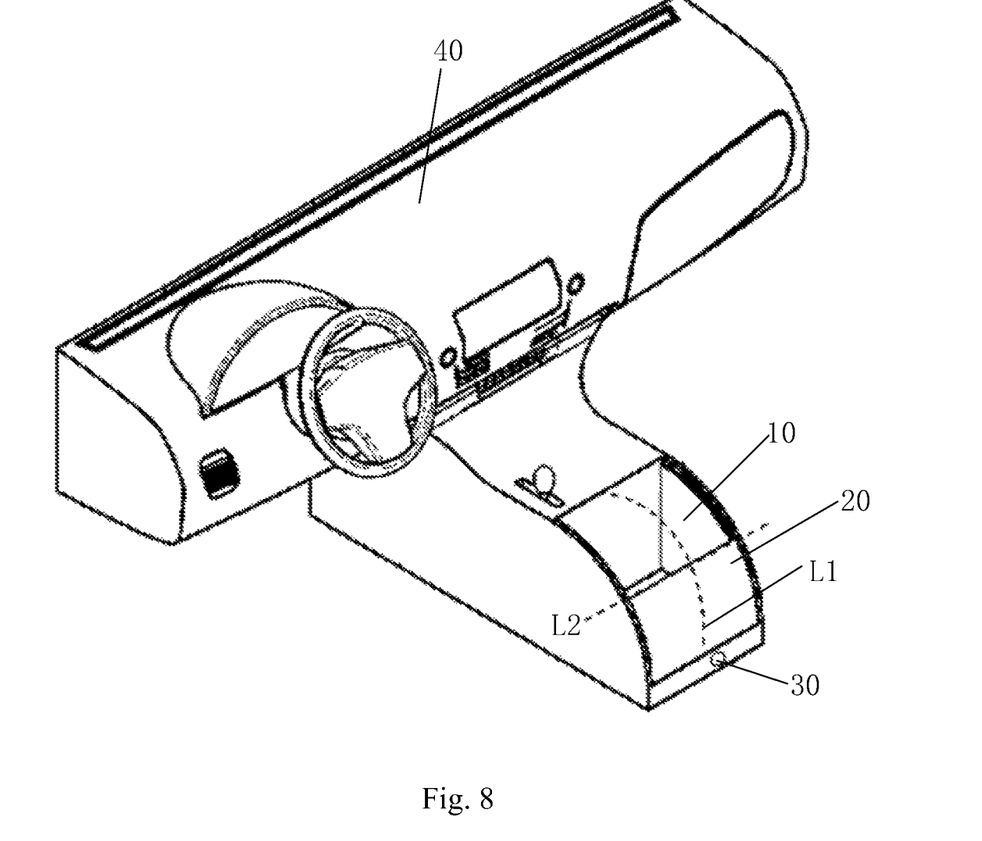
FIG. 8 is a schematic structural diagram of the display device, which is folded, in the other vehicular display assembly according to some embodiments of this disclosure.

Moreover, as illustrated in FIG. 7 and FIG. 8, the vehicular display assembly above can be arranged at the tail of the console 40 to provide display information for a passenger sitting behind. As illustrated in FIG. 7, when the display device is laid, it is flush with the opening of the storage box for a better effect of the display device being integral to the storage box; and as illustrated in FIG. 8, the display device can be controlled manually or mechanically to be switched to the folded state, and in order to protect a display screen of the display device, the display device can be controlled to be folded toward so that the display face of the display device faces inward. Optionally, when the driver or the passenger intends to switch the display device to the folded state, he or she can press down the physical button 30 so that the controller controls the rotatable section at the support layer to be rotated, under the control of a control signal of the physical button 30, to thereby bring the flexible display panel into being folded.

In a particular implementation, the vehicular display assembly above can be embedded on the console, or can be formed integral to the body of the console. The vehicular display assembly above can be applied to the vehicle so that the display device can be integrated with the storage box, so the vehicular display assembly has both a display function and a storage function, conforms to and thus appear integral to the internal contour of the vehicle, occupies a small space, is aesthetically pleasing, and has a scientific and technological sense. In this way, there are a diversity of applications of the display device, and the vehicle can be driven more conveniently.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A vehicular display assembly, comprising:
   a storage box;
   a display device arranged on an opening side of the storage box; and
   a controller configured to control the rotatable section to rotate, wherein:
   the display device comprises a laid state and a folded state, wherein the display device which is laid shields the opening of the storage box, and the display device which is folded exposes at least a part of the opening of the storage box;
   the display device comprises a flexible display panel, and a bendable support layer, located on a side of the flexible display panel away from a display face thereof, configured to support the flexible display panel;
   the support layer comprises: a fixed section, a rotatable section, and a pivot located between the fixed section and the rotatable section, wherein the fixed section is connected with the rotatable section through the pivot; and the fixed section is fixed relative to the opening of the storage box, and the rotatable section is configured to be rotated around the pivot to thereby bring the flexible display panel into being folded; and
   the controller is configured to control the rotatable section to rotate, by driving it electromagnetically, hydraulically, pneumatically, or using an elastic element or a connection rod.

2. The vehicular display assembly according to claim 1, further comprises a switching switch configured to control the controller to work.

3. The vehicular display assembly according to claim 2, wherein the switching switch is a physical button, or a virtual button in the display device.

4. The vehicular display assembly according to claim 1, wherein in response to that the display device is folded, a display face of the display device faces inward.

5. The vehicular display assembly according to claim 1, wherein in response to that the display device is laid, a display face of the display device is flush with the opening of the storage box.

6. The vehicular display assembly according to claim 1, wherein the display device is a touch display device.

7. A vehicle, comprising the vehicular display assembly according to claim 1.

8. The vehicle according to claim 7, further comprises a console located between primary and secondary driver seats; and
   the vehicular display assembly is arranged on the console.

9. The vehicle according to claim 7, wherein the vehicular display assembly further comprises a switching switch configured to control the controller to work.

10. The vehicle according to claim 9, wherein the switching switch is a physical button, or a virtual button in the display device.

11. The vehicle according to claim 7, wherein in response to that the display device is folded, a display face of the display device faces inward.

12. The vehicle according to claim 7, wherein in response to that the display device is laid, a display face of the display device is flush with the opening of the storage box.

* * * * *